| United States Patent [19] | [11] 4,243,909 |
|---|---|
| Brecher et al. | [45] Jan. 6, 1981 |

[54] FLUORESCENT LAMP ALKALINE EARTH HALOPHOSPHATE PHOSPHOR WITH PROTECTIVE $NaCs_2PrCl_6$ COATING

[75] Inventors: Charles Brecher, Lexington; Daniel W. Oblas, Bedford, both of Mass.

[73] Assignee: GTE Laboratories Incorporated, Waltham, Mass.

[21] Appl. No.: 1,117

[22] Filed: Jan. 5, 1979

[51] Int. Cl.³ .................. H01J 63/04; H01J 61/63
[52] U.S. Cl. ........................... 313/487; 313/489
[58] Field of Search ............ 313/489, 473, 468, 487; 252/301.4 H

[56] References Cited
U.S. PATENT DOCUMENTS

| | | | |
|---|---|---|---|
| 2,920,003 | 1/1960 | Davis | 428/404 |
| 3,664,862 | 5/1972 | Kingsley et al. | 252/301.4 F |
| 3,740,250 | 6/1973 | Hammond et al. | 428/539 |
| 3,890,522 | 6/1975 | Klein | 313/485 |
| 4,070,598 | 1/1978 | DeLuca et al. | 313/487 |
| 4,128,674 | 12/1978 | Hedler | 427/218 |

*Primary Examiner*—Robert Segal

[57] ABSTRACT

Improved fluorescent lamps utilize phosphors which comprise a major amount of a particulate phosphor such as a cool white alkaline earth halophosphate coated with a minor amount of a protective coating consisting of $NaCs_2PrCl_6$.

1 Claim, 4 Drawing Figures

FLUORESCENT LAMP ALKALINE EARTH HALOPHOSPHATE PHOSPHOR WITH PROTECTIVE NACS₂PRCL₆ COATING

BACKGROUND OF THE INVENTION

This invention relates to fluorescent lamps and to methods and materials for the fabrication thereof. More particularly, this invention concerns fluorescent lamp phosphors and coatings for fluorescent lamp phosphors.

Commercially available fluorescent lamps comprise an elongated tubular envelope having a pair of electrodes sealed into the opposite ends thereof. The envelope contains a gaseous atmosphere, which may be a mixture of a rare gas and a metal vapor, such as mercury vapor. The interior surface of the envelope is coated with a finely-divided fluorescent material which is exposed to the electrical discharge between the two electrodes, and is excited by the ultraviolet radiations emitted by this discharge. The fluorescent coating is usually applied by suspending particulate fluorescent or phosphor material in a suitable binder, flushing the interior of the tube with the suspension, permitting the excess suspension to drain out of the envelope, and then firing the interior wall of the coated envelope at a temperature which promotes adherence of the coating to the envelope walls and removes, generally by volatilization, the binder material. There results a phosphor layer or coating adhered to the inside or interior surfaces of the tubular envelope.

Thus, in the course of manufacture, as well as during operation of these fluorescent lamps, the phosphors used in these lamps experience a hostile environment. During manufacture, the lamp is baked at temperatures approximating 600° C. which can cause serious degradation of some phosphors. While the lamp is operating, the phosphor is in a mercury vapor discharge where it is subjected to ultraviolet radiation and bombardment by electrons and mercury atoms and ions. These factors may be responsible for lamp or phosphor maintenance losses; i.e., for the time-dependent decrease in luminous flux found in all fluorescent lamps.

One method for improving brightness and maintenance is to shield the phosphor from these effects by coating the phosphor particles with a protective film, and numerous attempts have been made to protectively coat the particulate phosphor material by using selected additions to the coating suspension. Such additives include silica, boric anhydride, sodium borate, mixtures of barium and ammonium nitrates, crystalline alkali halides, calcium pyrophosphate, ammonium dihydrogen phosphate, orthophosphoric acid, etc.

These materials have several disadvantages as fluorescent lamp phosphor coatings. The polycrystalline additions, by their very nature, cannot be expected to form an impervious film on the phosphors, therefore providing incomplete protection for the phosphor. Some of the materials are not chemically compatible with the phosphor, or are not sufficiently resistant to attack by mercury atoms. Some of the coating materials absorb ultraviolet radiation at 254 nanometers, the primary excitation wavelength for the lamp phosphor. Thus, while providing protection for the phosphor against the hostile lamp environment, such coatings may contribute to undesirable decreases in phosphor brightness. Some glassy coating materials such as boric anhydride, while transparent to ultraviolet radiation in the pure state, become absorptive upon contamination with sodium ion which migrates from the glass envelope to the phosphor during lamp operation.

Prior art phosphor coatings provide protection of the phosphor against the hostile lamp environment to varying extents, but generally are not capable of making a direct contribution to lamp brightness.

OBJECTS OF THE INVENTION

It is therefore an object of the present invention to provide an improved fluorescent lamp.

It is another object of the invention to provide an improved fluorescent lamp phosphor having a protective coating thereon.

It is a further object of this invention to provide a protective coating for fluorescent lamp phosphors which absorbs short wavelength ultraviolet radiation and thus improves phosphor maintenance.

It is a still further object of this invention to provide a protective fluorescent lamp phosphor coating which absorbs short wavelength ultraviolet radiation while transmitting the longer wavelengths of ultraviolet radiation effective in exciting lamp phosphors to fluorescence.

It is another object of this invention to provide a protective coating for fluorescent lamp phosphors which absorbs short wavelength ultraviolet radiation and is thereby excited to emit visible radiation.

It is a further object of this invention to provide a protective coating for fluorescent lamp phosphors which is stable under the conditions required for fluorescent lamp manufacture and in the environment of an operating lamp.

SUMMARY OF THE INVENTION

These and still further objects, features and advantages of the invention are achieved, in accordance therewith, by providing a fluorescent lamp having a tubular envelope, a layer of phosphor on the interior surface of the envelope, mercury vapor in the envelope, and a pair of electrodes spaced apart within the envelope, extending outside the envelope for connection to a means for producing an electrical discharge within the envelope. In accordance with the present invention, the layer of phosphor on the interior surface of the envelope consists essentially of a major amount of finely divided phosphor particles within a minor amount of protective coating consisting of material of the formula NaCs₂PrCl₆ (sodium dicesium praesodymium hexachloride). In a preferred embodiment of the present invention, the finely divided phosphor particles comprise an alkaline earth halophosphate cool white phosphor coated with NaCs₂PrCl₆.

The coating is preferably present in a thickness of between about 2 and 20 Ångstrom units on the surface of the phosphor particles.

For a better understanding of the present invention, together with other and further objects, advantages and capabilities thereof, reference is made to the following disclosure and appended claims in connection with the above-described drawings.

DETAILED DESCRIPTION

While a fluorescent lamp is operating, the fluorescent phosphor which coats the interior wall of the lamp envelope is in an electrical discharge where it is exposed to high energy ultraviolet radiation and bombardment by electrons and mercury atoms. Some 60% of the radiation emitted by excited mercury atoms at the low vapor pressures found in fluorescent lamps occurs at 254 nanometers wavelength as shown by the emission curve for excited mercury, curve 54 in FIG. 4. This radiation, absorbed by the phosphor layer in the lamp, excites in turn a broad band fluorescence of visible light. However, as further shown by curve 54 of FIG. 4, approximately 7% of the ultraviolet radiation emitted by excited mercury occurs at 185 nanometers wavelength. Although also absorbed by the lamp phosphor particles with a resulting contribution to the total visible fluorescence, these highly energetic photons contribute to maintenance losses in the phosphor, either through discoloration of the material, or through interference with the mechanism of fluorescent emission. Improved fluorescent lamps are provided by this invention by employing within such lamps a phosphor which is coated with a protective coating which absorbs ultraviolet radiation of 185 nanometers wavelength and re-emits a portion of this absorbed energy at visible wavelengths.

Figure 1:
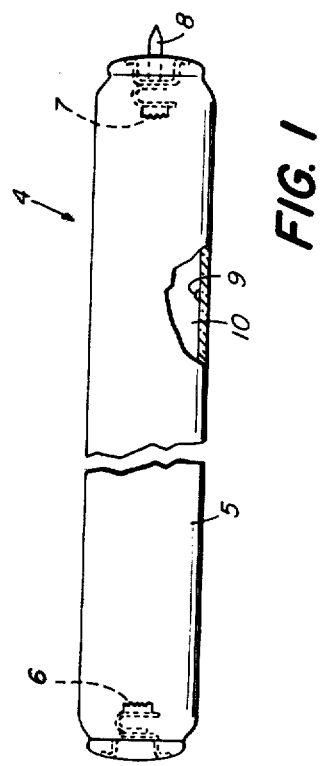
FIG. 1 shows a side view, partially broken away, of an exemplary flourescent lamp of the present invention.
Figure 3:
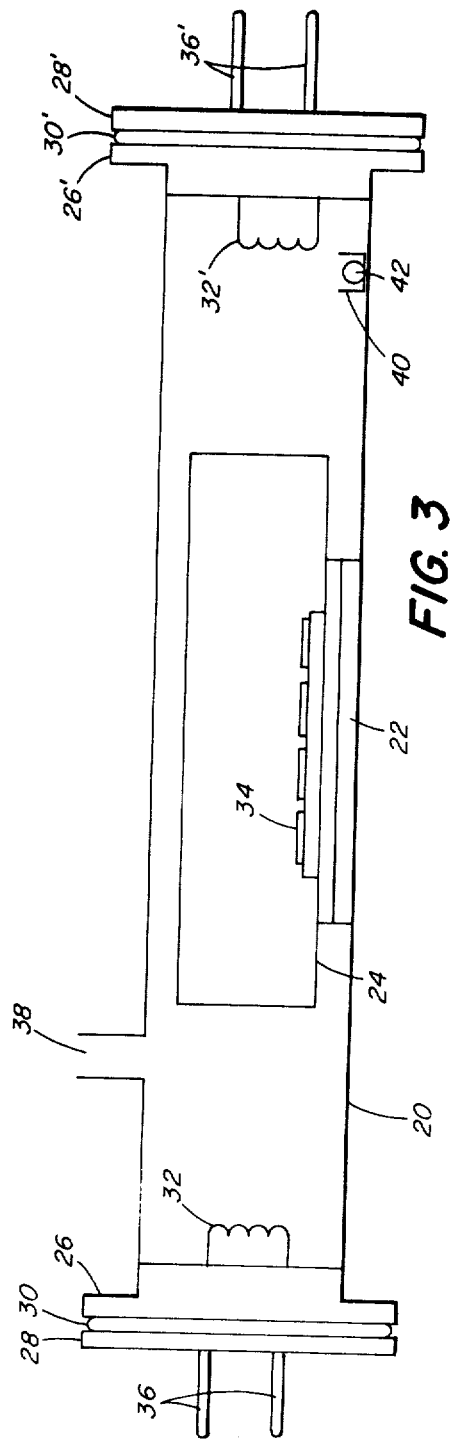
FIG. 3 shows in schematic lateral cross-section, the demountable fluorescent lamp used to evaluate protectively coated fluorescent lamp phosphors according to the present invention.

Improved fluorescent lamps according to the present invention, as shown in FIG. 1, comprise a tubular envelope 5, usually glass, with a pair of electrodes 6 and 7 disposed within the envelope 5 and spaced apart therein. The interior or inner surface of the envelope 5 is covered with a layer 10 of phosphor which, according to this invention, comprises a major amount of finely divided fluorescent lamp phosphor coated with a minor amount of $NaCs_2PrCl_6$.

During fabrication of the lamp 4, the phosphor coated envelope 5 is evacuated through exhaust stem 8, after which the envelope 5 is filled with an inert gas to facilitate starting, and a small amount of vaporizable material such as mercury 9.

Figure 2:
FIG. 2 shows in an enlarged cross-sectional view, a coated phosphor particle according to the present invention.

As shown in FIG. 2 in enlarged cross-section, improved fluorescent lamp phosphors according to the present invention comprise particles 12 of finely divided lamp phosphor coated with a thin protective coating 14 of $NaCs_2PrCl_6$. The phosphor particles 12 may comprise any material excited to visible fluorescent by ultraviolet radiation, but in a preferred embodiment the phosphor particles 12 comprise a cool white alkaline earth halophosphate phosphor of the type disclosed in U.S. Pat. No. 2,965,786 to Aia, et al.

Figure 4:
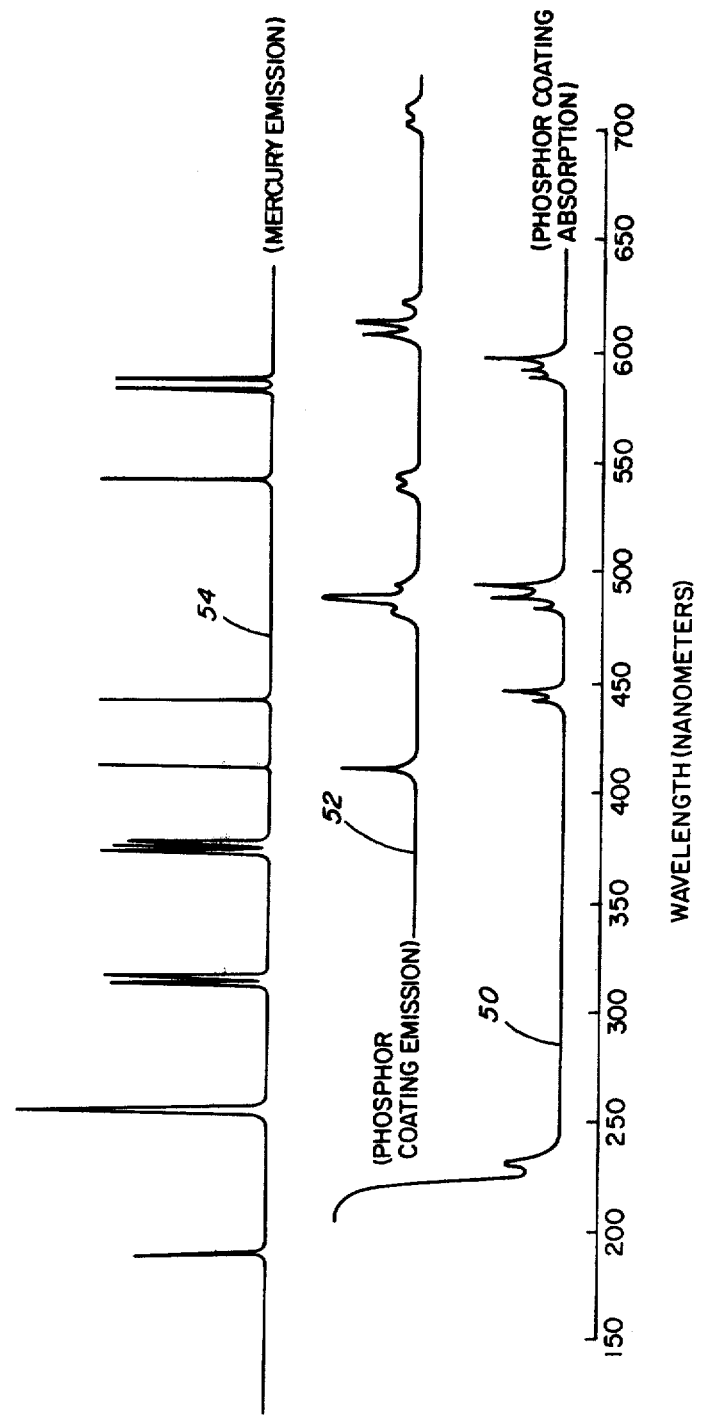
FIG. 4 shows the low pressure emission spectrum of mercury and the emission and absorption spectra of phosphor coating material according to the present invention.

The protective coating material, $NaCs_2PrCl_6$, in coated fluorescent lamp phosphors according to the present invention absorbs the damaging short wavelength ultraviolet radiation at 185 nanometers wavelength as shown by curve 50 in FIG. 4, which is the absorption curve for this material.

A portion of this absorbed energy is re-emitted as visible light as shown by the emission curve 52 for $NaCs_2PrCl_6$ in FIG. 4. This contribution to total phosphor luminance output enhances the phosphor brightness or, at the very least, compensates for any brightness losses suffered by the phosphor due to absorption by the protective coating of the 185 nanometer ultraviolet excitation energy.

As detailed in the Examples, the finely divided phosphor is protectively coated by slurrying together in an appropriate solvent, the particulate phosphor and a solution of $NaCs_2PrCl_6$. The solvent can be water or a low molecular weight alcohol such as methanol or ethanol. The slurried mixture is allowed to mix for about ½ hour in order for the protective coating material to be adsorbed on the surface of the phosphor particles. At the end of this time, the supernate is decanted from the coated phosphor or alternatively the mixture is filtered to separate the coated phosphor. The solvent remaining on the phosphor is removed by evaporation. The resulting protectively coated dry phosphor is used to prepare fluorescent lamps according to the present invention by slurry techniques. It has been found that the coating does not render the coated phosphor incompatible with any phase or step of standard lamp fabrication methods.

By varying the relative amounts of finely divided phosphor material and coating material solution, it is possible to achieve various thicknesses of protective coating on the phosphor particles. While it is necessary to provide a coating of sufficient thickness to absorb the short wavelength ultraviolet radiation, it has been found that coatings which are too thick reduce initial phosphor brightness levels and lamp maintenance. Preferred coating thicknesses for protectively coated fluorescent lamp phosphors according to the present invention range between a coating monolayer thickness, approximately 2 Ångstroms thick, up to a coating layer of about 20 Ångstroms thick. If the coating layer greatly exceeds 20 Ångstroms thickness, there is an attendant decrease in both initial phosphor brightness and maintenance. Coating thicknesses of about 10 Ångstroms thickness are particularly effective for coated fluorescent lamp phosphors according to the present invention.

Desired coating thicknesses can be applied to fluorescent lamp phosphors by methods detailed in the following Examples. As shown by electron spectroscopy chemical analysis (ESCA), the coating thickness does not exceed about 20 Ångstroms thickness when the initial ratio of coating material to particulate phosphor is about 2 milligrams per gram as in Example III. As shown in the accompanying Table, the maintenance of phosphors coated with $NaCs_2PrCl_6$ at this level is considerably improved over uncoated phosphors or of phosphors coated at much higher levels as illustrated by Examples IV and V.

EXAMPLES

The following Examples are typical of preparations of protectively coated phosphors according to the present invention and are not to be construed as necessarily limiting thereof.

A concentrated solution of $NaCs_2PrCl_6$ was prepared at room temperature by dissolving $NaCs_2PrCl_6$ in methanol. This solution was found to contain about 25 mg/ml of the dissolved coating material, and formed the stock solution from which the coated phosphors were prepared.

EXAMPLE I

The material of Example I was an antimony-manganese activated cool white calcium halophosphate fluorescent lamp phosphor, designated GTE Sylvania Type 4458, available from GTE Sylvania Precision Materials Products, Towanda, Pennsylvania. This phosphor was not coated and served as a control for Examples III–V.

EXAMPLE II

GTE Sylvania Type 4458 phosphor was washed with methanol to test the effects of solvent treatment on phosphor brightness and maintenance.

EXAMPLE III

Three hundred grams of Type 4458 cool white phosphor were slurried in methanol. To this slurry were added 25 ml of the stock solution of $NaCs_2PrCl_6$ and sufficient methanol to make a total volume of one liter. The slurry was allowed to mix for one half hour and then filtered to remove the coated phosphor. The filtered, coated phosphor was dried.

EXAMPLE IV

Three hundred grams of GTE Sylvania Type 4458 phosphor were treated with 100 ml of the stock solution of $NaCs_2PrCl_6$ in the same manner as detailed in Example III above.

EXAMPLE V

Three hundred grams of GTE Sylvania Type 4458 phosphor were treated with 500 ml of the stock solution of $NaCs_2PrCl_6$ in the same manner as detailed in Example III above.

Electron microscopy of the coated phosphors indicated an apparent smooth, integral coating of $NaCs_2PrCl_6$ on the phosphor particles in each Example.

Standard 40 watt cool white fluorescent lamps were fabricated, using the phosphors of Examples I–V above. The luminance and maintenance data for these lamps appear in the accompanying Table.

The effect of the phosphor coating on fluorescent lamp phosphor maintenance was further evaluated under accelerated testing conditions at higher-than-normal electrical power loads using a demountable fluorescent lamp (DFL) illustrated schematically in FIG. 2. As shown there, a glass tube, 1 9/16 inches in diameter 20 was fitted at each end with stainless steel flanges 26 and 26'. The glass tube 20 had a lateral port 38 through which the tube was evacuated by means of a tube and vacuum pump not shown.

The glass tube 20 was sealed at each end by means of copper O-rings 30 and 30' and end plates 28 and 28'. Each end plate 28 and 28' was fitted with electrical connectors 36 and 36' which were electrically insulated from the end plates 28 and 28' but which made electrical contact with filaments 32 and 32'.

The coated fluorescent lamp phosphors according to the present invention were applied to small glass discs 34 which were placed on a sample tray 44. The sample tray 44 was positioned inside a 1 inch diameter glass tube 24 which was supported concentrically inside glass tube 20 by means of support blocks 22. Glass tube 24 was a section cut from a standard 40 watt fluorescent lamp and as such was coated on its inner surface with calcium halophosphate phosphor. A small reservoir 40 within the tube 20 contained a supply of mercury 42.

Prior to test operation, the DFL was evacuated through port 38 and baked overnight at 225° C. Following this initial heat treatment, the DFL was heated at about 300° C. for two more hours. The DFL was then filled with neon to a pressure of 1.5 torr. The lamp was then lighted at a voltage of 110 volts and a current of 2.5 amperes using a standard fluorescent lamp ballast transformer.

At the end of each of several operating periods, the lamp was turned off and the sample tray 44 was removed for analysis. The phosphor samples were excited by means of an ultraviolet lamp, and the intensity of the visible light emitted by the irradiated sample was measured by means of a Tektronix J-16 photometer and a 1° narrow angle luminance probe.

The data from the tests of phosphor maintenance in the DFL parallel the maintenance data obtained from the 40 watt fluorescent lamps which were fabricated using the phosphors of Examples I–V above. The latter data appear in the accompanying Table where the parenthetical values are phosphor maintenance values expressed as percentage, obtained by dividing each luminance figure by the initial luminance figure.

The data show that the material of Example III, comprising an alkaline earth halophosphate phosphor coated with $NaCs_2PrCl_6$ at an initial slurrying level of about 2 milligrams per gram of particulate phosphor, had the highest maintenance of all phosphors tested. The maintenance of this phosphor exceeded that of uncoated halophosphate phosphors and of the halophosphate phosphors coated at higher levels of $NaCs_2PrCl_6$ loading.

TABLE

| EX. | PHOSPHOR | Mg COATING*<br>G PHOSPHOR | PHOSPHOR LUMINANCE (MAINTENANCE) | | | | | | |
|---|---|---|---|---|---|---|---|---|---|
| | | | 0 HRS | 100 HRS | 300 HRS | 500 HRS | 875 HRS | 1750 HRS | 3000 HRS |
| I | Type 4458 Halophosphate | 0 | 3232 | 3113 (96.3%) | 3064 (94.8%) | 3045 (94.2%) | 2996 (92.6%) | 2972 (91.9%) | 2888 (89.4%) |
| II | Type 4458 Halophosphate | 0 | 3242 | 3115 (96.1%) | 3063 (94.5%) | 3045 (93.9%) | 2994 (92.4%) | 2950 (91.0%) | 2872 (88.6%) |
| III | Coated 4458 Halophosphate | ~2 | 2972 | 3061 (103.0%) | 3016 (101.5%) | 3012 (101.3%) | 2983 (100.4%) | 2936 (98.7%) | 2868 (96.5%) |
| IV | Coated 4458 Halophosphate | ~8 | 3037 | 2240 (73.7%) | — | — | — | — | — |
| V | Coated 4458 Halophosphate | ~50 | 2762 | 743 (26.9%) | — | — | — | — | — |

*Level of coating material initially present in the slurry during preparation of the coated phosphor.

The data of the accompanying Table indicate considerable improvement in phosphor maintenance levels when particulate fluorescent lamp phosphors are coated in accordance with the present invention.

While there has been shown and described what are at present considered the preferred embodiments of the invention, it will be obvious to those skilled in the art that various changes and modifications may be made therein without departing from the scope of the invention as defined by the appended claims.

What we claim is:

1. A fluorescent lamp comprising:

a tubular envelope;

a phosphor layer on the interior surface of said envelope, said layer consisting essentially of finely-divided phosphor particles of a cool white alkaline earth halophosphate phosphor, each particle having a thin protective coating consisting of $NaCs_2PrCl_6$ of about 10 Angstroms thickness;

said protective coating being essentially opaque to ultraviolet radiation of wavelengths less than about 250 nanometers but excited thereby to emit visible radiation;

mercury vapor within said envelope; and a pair of electrodes spaced apart within said tubular envelope and being adapted for connection, at those portions thereof extending outside of said envelope, to means for producing an electric discharge within said tubular envelope.

* * * * *